United States Patent [19]

Molinero

[11] Patent Number: 5,711,979
[45] Date of Patent: Jan. 27, 1998

[54] PROCESS FOR PREPARING A MEAT PRODUCT SUITABLE TO BE COOKED IN A MICROWAVE OVEN

[76] Inventor: Iris Marcela Molinero, Estancia La Blanca-Luan Toro, La Pampa-6317, Argentina

[21] Appl. No.: 647,868

[22] Filed: May 15, 1996

[30] Foreign Application Priority Data

Jan. 9, 1996 [AR] Argentina ............... 0334972

[51] Int. Cl.⁶ .................................... A23L 1/00
[52] U.S. Cl. ................. 426/243; 426/520; 426/524
[58] Field of Search ........................ 426/520, 524, 426/243, 241

[56] References Cited

U.S. PATENT DOCUMENTS 5,472,725  12/1995  Mendenhall ............... 426/524

*Primary Examiner*—George Yeung
*Attorney, Agent, or Firm*—Ratner & Prestia

[57] ABSTRACT

A process for preparing a meat product to be cooked in a microwave oven comprising the following steps. Freezing the meat product; partially thawing the meat product whereby the exterior surface is thawed and the nucleus remains frozen; conventionally heating the thawed surface to seal the surface; and re-freezing the sealed surface of the meat product.

19 Claims, No Drawings

PROCESS FOR PREPARING A MEAT PRODUCT SUITABLE TO BE COOKED IN A MICROWAVE OVEN

BACKGROUND OF THE INVENTION

1. Field of the Invention

This invention relates to a method for processing meat products. More particularly, the process of the present invention comprises the treatment of a meat product so that it is suitable to be cooked in a microwave oven.

2. Description of Related Art

The use of microwave ovens has become quite widespread. One mode of such widespread use is to re-warm pre-cooked meals. As such, the food industry has been manufacturing precooked meals, which are pre-packaged in sterilized form and/or frozen so that they are capable of being cooked in a microwave oven. Generally, meals prepared this way have the advantages of a shorter cooking time as well as minimal smoke and odor generation. However, it is well known that most meals cooked in such a way in a microwave oven do not end up having a good surface texture.

The most noticeable example of such a problem can be seen with meat products. Although meat products, such as beef, chicken, pork, etc., can be cooked in a microwave oven, they usually come out looking very pale and unattractive.

Attempts have been made to solve this problem by making certain modifications to the microwave ovens themselves. Some examples include electrical resistors and hot plates. However, these changes still don't take care of the inevitable problem of the production of smoke and smells, and require hardware modifications.

It is therefore an objective of the present invention to provide a process for resolving these problems by producing a meat product which is capable of being cooked in a conventional microwave oven with the resulting surface appearance of a piece of meat cooked on a grill or a hot plate, and maintaining the same flavor while keeping the juices inside.

SUMMARY OF THE INVENTION

The present invention is a process for preparing a meat product, having an exterior surface and a nucleus, to be cooked in a microwave oven, comprising the steps of:

A. freezing said meat product;

B. partially thawing said meat product whereby the exterior surface is thawed and the nucleus remains frozen;

C. conventionally heating the thawed surface to seal said surface; and

D. re-freezing said sealed surface of said meat product.

The invention can be more fully understood from the following description thereof.

DESCRIPTION OF THE PREFERRED EMBODIMENT(S)

The described process allows one to obtain slices of meat, such as steaks, chops, etc., with a grilled look exterior after cooking the meat in a conventional microwave oven. This grilled look is obtained due to a quick contact of a partially thawed piece of meat with a metal sheet heated to a high temperature, preferably between 400° and 600° C. This process, in addition to providing the meat with an attractive appearance, has the advantage of sealing the external surfaces, providing instant coagulation of proteins, and preventing the loss of juices during thawing and cooking of the meat in the microwave oven. As is well known in the art, the retention of the juices is not only important in conserving the nutrients, but is also indispensable in preserving the natural tenderness of the meat.

The type of meats which are adequate for use in the process of this invention as described below include sirloin, short loin, tenderloin, loin fillet, sausage beef, pork, lamb, chicken, fish, and any other meat product which can be cooked on a grill or pan. It is generally preferred that the meat be boneless.

Turning now to the process of the present invention, the first step requires freezing the meat product. It is preferred that the meat product be frozen at temperatures ranging from $-10°$ to $-20°$ C. This provides for significant preservation of the meat to allow for adequate industrial scale production.

The next step in this process is cutting the frozen meat product into a plurality of meat portions. The cutting of such whole pieces as previously treated (i.e. frozen at the preferred temperatures) gives, as a result, meat pieces which are equally uniform in state. With regard to the form of the meat portions, it is preferred that they be cut into equal sized pieces, although pieces of varying size will also work. The sizes of the portions are preferably 3 centimeters thick, although this size will vary depending upon the type of meat being cooked and the individual who is preparing the meat.

In some cases, such as with fish and chicken, the meat product is naturally of an adequate size or has already been cut to an adequate size. In such cases, it is not necessary to re-cut the frozen meat product as just described.

Once the meat product has been cut into the desired sized portions, the next step is to partially thaw each of the portions. The portions are partially thawed in such a way that only the exterior surfaces are thawed, while the nucleus or center of each portion remains frozen. It is preferable that the surfaces of the portions are thawed from 1 to 3 millimeters in depth, although this depth will depend upon the thickness of the portions. It is essential that a substantial amount of the meat, i.e. the core or nucleus, remain frozen. Thus, for example, if the meat portion is only 1 centimeter thick, then one should not exceed thawing the surface area to more than 1 millimeter in depth.

After thawing the meat portions to the appropriate depth, the next step involves sealing the thawed meat surfaces. Sealing is done by heating the entire thawed surface area of the meat portion using a conventional heat source such as, for example, convection or radiant heating. In the preferred mode, the entire surface areas of the meat portions are contacted with a heated element, such a heated metal sheet. This heated element can have a plain surface or, for example, one with parallel grooves, in order to give the desired appearance or texture on the surface of the meat. Of course, a grooved surface on the sheet will provide the meat with a "grilled" look, whereas the flat sheet will give more of a baked or fried look. In the preferred mode, the surface of the heated metal sheets should be in the range of 400° to 600° C., although any temperature which will seal the thawed meat and provide the desired textured look is acceptable for use in this process.

The peripheral sealing may be obtained by, for example, a metal roller heated to the same temperature as the heated sheet described above. The contact of each surface of the meat portion with the hot metallic surface may be achieved by sequential contact to a single hot metal surface or by simultaneous contact to two surfaces, such as, for example, one on top and the other at the bottom of the meat portion. The peripheral sealing is achieved by making contact with the entire surface of the piece of meat, for a preferred period of 2 to 3 minutes for each surface.

After sealing, the sealed portions are packaged and re-frozen, preferably to a temperature ranging from −10° to −20° C. Once frozen, these pieces are ready for final preparation and can be placed directly into a microwave oven, thawed and then cooked.

The procedure of the present invention can also be applied to the preparation of various other meat products such as, for example, ground beef in, for instance, the preparation of hamburgers. When a ground beef hamburger is cooked in the manner of this invention as described above, the burger has a resulting appearance as though it was cooked by means of traditional cooking methods, such as a grill, hot plate, etc.

The following examples are given as descriptions, but are not intended to limit the invention.

EXAMPLE 1

A full piece of meat, of a cut of short loin, with a weight of 4 Kg, was frozen to −18° C. Then, it was removed from the freezer and it was cut into slices, 3 cm thick. A slice was left at ambient temperature, until it was observed that its outer surfaces were softened to a depth of 2 mm. Immediately, each surface of the meat was placed in contact with a red hot metal surface, set at a temperature of 450° C., for a period of 3 min on each side. Then, the piece of meat was rolled on its side, over the same hot metal surface, with special care taken over its greasy area.

This piece was placed in a freezer bag and re-frozen to the initial temperature of −18° C.

The element, so treated and frozen, was placed in a microwave oven. Microwave energy was used in two stages. First, the oven output was regulated to provide thawing of the meat. Upon adequate thawing, the energy was then increased for cooking. No loss of fluids was observed. The exterior appearance of the meat was that of a beef piece cooked on a hot plate. The resulting tenderness of the piece was as expected for the cut of meat used.

EXAMPLE 2

A mass of ground meat, without salt, was prepared as follows. The mass was compacted into a cylindrical mold, 50 cm long and 10 cm of internal diameter. It was frozen to −18° C. It was then removed from the freezer and cut into 1.5 centimeter thick slices to form hamburgers.

An individual slice of Hamburger was held at ambient temperature until a 1 to 2 mm thick surface layer was observed to be thawed. Immediately, the hamburger slice was placed on a hot plate, with parallel grooves, at a temperature of 450° C. for 1 min. The hamburger slice was then flipped over, making contact with the other side for 1.5 min. The hamburger slice was then placed in a bag and returned immediately to the freezer at the original temperature of −18° C.

The hamburger so treated and frozen, was later removed with its container and it was placed in a microwave oven. The oven was again used to thaw and then to cook the meat. No loss of fluids was observed. Its exterior appearance was that of a hamburger cooked on a grill.

Those skilled in the art having the benefit of the teachings of the present invention as hereinabove set forth, can effect numerous modifications thereto. These modifications are to be construed as being encompassed within the scope of the present invention as set forth in the appended claims.

I claim:

1. A process for preparing and microwaving a meat product having an exterior surface and a nucleus, comprising the steps of:
   A. freezing said meat product;
   B. partially thawing said meat product whereby the exterior surface is thawed and the nucleus remains frozen;
   C. sealing the surface of said partially thawed meat product by conventionally heating the thawed surface on a metallic surface heated to a temperature ranging from 400° C. to 600° C.;
   D. re-freezing said sealed surface of said meat product; and
   E. microwaving said re-frozen meat product using a two step process comprising:
      1. regulating microwave energy to thaw the meat product; and
      2. upon adequate thawing, increasing said energy to cook said meat product.

2. The process of claim 1 wherein the meat product is sealed by touching the surface of said meat product with a heated surface for a predetermined period of time.

3. The process of claim 2 wherein, prior to the re-freezing step, the meat product with said sealed surface is packaged.

4. The process of claim 1 wherein the surface of said meat product is thawed to a depth of approximately 1 to 3 millimeters.

5. The process of claim 1 wherein the sealing step is performed for a period of approximately 2 to 3 minutes.

6. The process of claim 1 wherein the meat product is frozen to a temperature of approximately −10° C. to −20° C.

7. The process of claim 1 wherein the meat product further comprises two principal surfaces.

8. The process of claim 7 wherein the sealing step is performed simultaneously on each of said principal surfaces.

9. A process for preparing and microwaving a meat product comprising the steps of:
   A. freezing said meat product;
   B. cutting the frozen meat product into a plurality of meat portions, said meat portions having a nucleus and a plurality of surfaces;
   C. partially thawing at least one of said meat portions whereby the surfaces are thawed and the nucleus remains frozen;
   D. sealing the surface of each partially thawed meat portion by conventionally heating each thawed surface on a metallic surface heated to a temperature ranging from 400° C. to 600° C.;
   E. re-freezing each of the sealed surfaces of said meat portions; and
   F. microwaving said re-frozen meat product using a two step process comprising:
      1. regulating microwave energy to thaw the meat product; and
      2. upon adequate thawing, increasing said energy to cook said meat product.

10. The process of claim 9 wherein, prior to the re-freezing step, said sealed meat portion is packaged.

11. The process of claim 9 wherein the surfaces of said meat portions are thawed to a depth of approximately 1 to 3 millimeters.

12. The process of claim 9 wherein the sealing step is performed for a period of approximately 2 to 3 minutes for each surface of said meat portions.

13. The process of claim 9 wherein the meat product is frozen to a temperature of approximately −10° C. to −20° C.

14. The process of claim 9 wherein the meat portions are frozen to a temperature of approximately −10° C. to −20° C.

15. The process of claim 9 wherein each meat portion further comprises two principal surfaces.

16. The process of claim 15 wherein the sealing step is performed simultaneously on each of said principal surfaces.

17. The process of claim 9 wherein the meat portions each are approximately 3 centimeters in thickness.

18. The process of claim 9 wherein the meat portions are equivalent in size.

19. The process of claim 18 wherein the meat portions each are approximately 3 centimeters in thickness.

* * * * *